United States Patent Office 3,677,858
Patented July 18, 1972

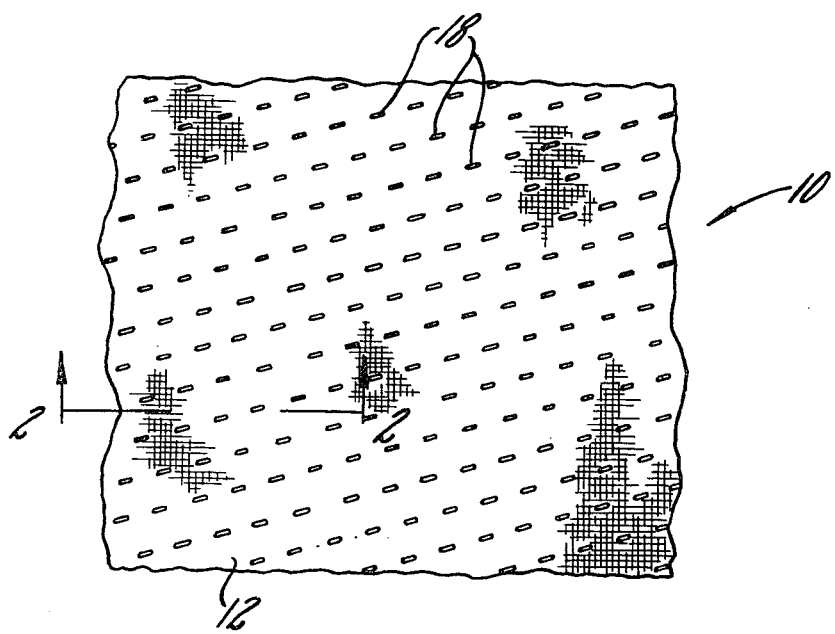
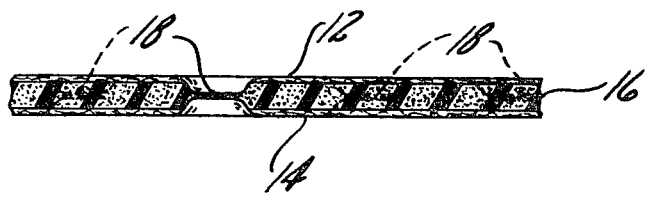

3,677,858
HIGH TEMPERATURE AND PRESSURE BONDING
OF URETHANE FOAM
Robert C. Sokolowski, Menasha, Wis., assignor to
Kimberly-Clark Corporation, Neenah, Wis.
Filed Apr. 27, 1970, Ser. No. 32,080
Int. Cl. B32b 31/20
U.S. Cl. 156—219    4 Claims

ABSTRACT OF THE DISCLOSURE

The surface characteristics of a polyurethane foam are modified by laminating the foam to a cellulosic web. Lamination is accomplished by placing the cellulosic web in contact with the foam and thereafter bonding the web-foam structure at intermittent points by the application of heat and pressure in particular amounts.

DESCRIPTION OF THE INVENTION

Thin, lightweight polyurethane foams are finding increased use in wipe and toweling applications. Due to the highly porous character of the foams, they are quite suitable in such applications since they have the capacity for absorbing and retaining large quantities of moisture, particularly when the foam has been treated in a manner so as to render it hydrophilic. While for many applications, the urethane foam is quite satisfactory by itself, certain applications require that the surface of the foam be modified in order to make it smoother or exhibit a more desirable appearance. One way of modifying the surface is to laminate a lightweight layer of cellulose tissue to one or both of the foam's surfaces. The tissue layer not only provides a smooth surface, but additionally yields a product which, in appearance, resembles conventional wipes and toweling.

While the advantages of forming a laminate as above discussed are apparent, the problem has been to accomplish lamination without adversely affecting other desirable properties such as the foam's porosity or its desirable soft, flexible character. In this respect, conventional lamination techniques employing adhesives in order to effect ply attachment are generally unsuitable. The adhesive tends to migrate into the urethane pore structure during bonding and thus diminishes, the porosity of the foam. The adhesive also tends to detract from the absorbent properties by restricting the capacity of the absorbent member or members. Such is true even when adhesives are applied in a patterned fashion. Moreover, in order to achieve sufficient delamination resistance, it has been found that an unacceptably large quantity of adhesive must be employed. The use of such amounts is not only economically unattractive and gives rise to the aforementioned undesirable affects, but can also additionally result in a stiff laminate.

Accordingly, it is an object of the present invention to provide a soft, flexible polyurethane foam laminate with desirable surface characteristics. It is a related object to provide such a foam which, in appearance, resembles conventional wipes and toweling.

Another object is to provide a foam as above described in a convenient and economical fashion.

Other objects and advantages of the present invention will become apparent upon reading the following detailed description and upon reference to the drawings, in which:

FIG. 1 is a top plan view of a structure embodying the present invention, and

FIG. 2 is a cross sectional view of the structure depicted in FIG. 1 taken along line 2—2.

While the invention will be described in connection with certain preferred embodiments, it will be understood that it is not intended to limit the invention to those particular embodiments. On the contrary, it is intended to cover all alternatives, modifications, and equivalents as can be included within the spirit and scope of the invention.

Briefly, the present invention concerns the preparation of a structure comprising a layer of a lightweight cellulosic web and a layer of polyurethane foam. The structure is prepared solely by the application of pressure and temperature at intermittent points on the surface thereof. In appreciating the advantages provided by the present invention, it should be realized that the fact that a cellulosic web can be bonded to polyurethane foam by the application of heat and pressure is quite unexpected. As opposed to thermoplastic polymers, polyurethanes are substantially cross-linked and, accordingly, it would not be expected that they would exhibit adhesive characteristics at temperatures which would not also be detrimental to the cellulosic webs. However, as explained hereinafter, there is a temperature range well below the 400° C. or so melting point of the foam where the urethane foam exhibits adhesive characteristics and, thus, can be laminated. Moreover, by restricting the bonding area to intermittent points, a highly desirable structure such as provided for in the above recited objects can be obtained.

Turning to the drawing, FIGS. 1 and 2 illustrates a structure 10 containing outer layers of lightweight cellulosic webs 12 and 14 and an inner layer of a polyurethane foam 16. As illustrated, the cellulosic webs and the polyurethane foam are united into a coherent structure by means of the intermittent spot bonds 18.

Cellulosic webs useful in preparing the illustrated structure can be selected from a wide variety of known materials. In selecting an appropriate web, the primary requirements are that it have the desired surface qualities for the intended end use, and that it be capable of being bonded to the polyurethane foam in the manner hereinafter described without being adversely affected. Conventional creped cellulose wadding (i.e., tissue) is perhaps the most common cellulosic web, though other webs such as those of cotton, rayon, or other synthetic fibers can also be employed. In the structure illustrated in FIG. 1, the cellulosic web will generally have a basis weight, per 2880 ft.$^2$, of about 5–15 lbs., with webs having basis weights of about 6–10 lbs. being particularly preferred.

As with the cellulosic web, the polyurethane foam can also be selected from a variety of such foams so long as the foam can be bonded as hereinafter described. In general, useful foams are prepared by reacting a polyisocyanate with a polyol in the presence of a suitable catalyst and a blowing agent. The most common polyurethane foam is that prepared by reacting toluene diisocyanate with a polyester ether such polyethylene glycol or polypropylene glycol in a molar ratio of about 1 to 1 using a tertiary amine catalyst such an N-ethyl morpholine or diethyl benzylamine. Water or a fluorinated hydrocarbon ("Freons") are customarily used as blowing agents. Reference is made to U.S. Pat. 3,308,081, issued on June 11, 1968 to Merten and Braun for a comprehensive description of the preparation of useful polyurethane foams. Particular attention is directed to that portion of the patent starting in column 3 at line 16, and continuing through column 5 line 32. For use in the laminate illustrated in FIG. 1, the polyurethane foam usually has a thickness of about 25–250 mils, with foams having thicknesses of about 25–60 mils being particularly preferred.

The structure illustrated in FIG. 1 can be conveniently prepared by placing the unbonded 3-ply laminate between heated plates, at least one of which, and preferably both of which, have raised portions on their surfaces so as to produce selective pressure points on the laminate. While the raised portions can be fashioned in any manner to produce the pressure points, the total area of the pressure points (i.e., the bond area) as well as their density (number of bonds/in.$^2$) should not be such as to detract from the flexibility and feel of the resulting bonded structure On the other hand, the bonded area must be sufficient to yield a structure with good delamination resistance. A total bond area of about 1-20% and, preferably, about 1.5-5%, based on the total laminate area, in combination with a bond density of about 10-100 and, preferably, 20-50 bonds/inch$^2$ will yield desirable products.

Plates which can be used in forming the illustrated laminates are those containing ridges running in a given direction. In use, the plates are placed at oblique angles to each other so as to provide pressure points where the ridges cross. Alternatively, plates with raised embossing points in register with each other can be employed. Additional, only one plate need have the embossing points, the other being substantially smooth. In a further embodiment, the laminates can be bonded by being passed through the nip formed between rolls patterned or ridged so as to produce pressure points on the laminate. Such a procedure is particularly advantageous when bonded laminates are to be obtained in a continuous fashion.

The conditions of temperature and pressure under which bonding is accomplished must be sufficiently intense to cause the polyurethane at the particular bonding points to flow. Additionally, dwell time (i.e., the time during which the laminate is subjected to the bonding conditions) must be sufficient to permit the polyurethane foam to achieve an appropriate bonding temperature. In general, bonding temperatures in excess of about 150° C. have been found to be useful. Temperatures in excess of about 180° C. should be avoided since such temperatures adversely affect the cellulosic components of the structure. The appropriate bonding pressure is tied to the temperature employed with higher pressures being used with lower temperatures. In general, at a temperature of about 150° C.-180° C., a bonding pressure of about 40,000 p.s.i.-10,000 p.s.i. is useful with, as emphasized above, higher pressures being associated with lower temperatures.

The following examples illustrate the present invention. All parts and percentages are by weight unless otherwise indicated.

Examples 1-4, presented in Table 1, illustrate useful bonding conditions for preparing a structure comprised of outer plies of creped cellulose wadding, each of which has a basis weight of 13 lbs./2880 ft.$^2$, and a single inner ply of 40 mil polyurethane foam having a weight of about 1.8 lbs./ft.$^3$. The structures were prepared under the conditions set forth in the table by placing the unbonded structure between two ridged, heated plates placed at oblique angles to each other. Total bond area was about 3.75%. Delamination resistance was evaluated by manually stripping a layer of the cellulose wadding from the foam and noting whether fibers from the wadding remained in the bonded areas. If a noticeable quantity of fibers remained, delamination resistance was rated as good. If very few fibers remained, the delamination resistance was considered poor.

TABLE 1

| | Bonding conditions | | | |
|---|---|---|---|---|
| | Temperature (° C.) | Pressure (p.s.i.) | Dwell time (sec.) | Delamination resistance |
| Example: | | | | |
| 1 | 164 | 13,000 | 180 | Very good. |
| 2 | 159 | 28,200 | 120 | Do. |
| 3 | 152 | 34,800 | 120 | Do. |
| 4 | 162 | 13,000 | 60 | Good. |
| Comp.: | | | | |
| 1 | 157 | 2,000 | 60 | Poor. |
| 2 | 152 | 13,000 | 60 | Do. |
| 3 | 154 | 13,000 | 5 | Do. |

I claim as my invention:

1. A process of bonding an absorbent cellulosic web to a web of absorbent polyurethane foam without substantially restricting the absorptive capacity of said webs, comprising the steps of:
    placing the webs into contact with one another; and, applying heat within the range of about 150° to about 180° C., and pressure within the range of about 10,000 to about 40,000 p.s.i. at intermittent bond points, the combination of said heat and pressure being sufficient to cause bonding of said webs at said bond points, without causing degradation of said cellulosic web.

2. The process of claim 1 wherein the cellulosic web is cellulose wadding.

3. The process of claim 2 wherein the total bond area is about 1-20% and the bond density is about 10-100 per in.$^2$.

4. The process of claim 1 wherein the total bond area is about 1.5-5% and the bond density is about 20-50 per in.$^2$.

References Cited

UNITED STATES PATENTS

| 3,497,416 | 2/1970 | Critchfield | 161—159 UX |
| 3,265,551 | 8/1966 | Ananian et al. | 156—219 |
| 3,556,918 | 1/1971 | Lemelson | 156—290 X |
| 3,244,571 | 4/1966 | Weisman | 156—290 X |

CARL D. QUARFORTH, Primary Examiner

E. E. LEHMANN, Assistant Examiner

U.S. Cl. X.R.

156—272, 288, 290, 306; 161—161